United States Patent
Ho

(12) United States Patent     (10) Patent No.: US 9,309,010 B2
     Ho                                           (45) Date of Patent:     Apr. 12, 2016

(54) METHODS AND APPARATUS FOR CONTROLLING A PLURALITY OF SATELLITES USING NODE-SYNCHRONOUS ECCENTRICITY CONTROL

(71) Applicant: The Boeing Company, Seal Beach, CA (US)

(72) Inventor: Yiu-hung M. Ho, Palos Verdes Estates, CA (US)

(73) Assignee: The Boeing Company, Chicago, IL (US)

(*) Notice: Subject to any disclaimer, the term of this patent is extended or adjusted under 35 U.S.C. 154(b) by 71 days.

(21) Appl. No.: 14/152,344

(22) Filed: Jan. 10, 2014

(65) Prior Publication Data

US 2015/0197350 A1     Jul. 16, 2015

(51) Int. Cl.
    *B64G 1/24*              (2006.01)
    *B64G 1/10*              (2006.01)

(52) U.S. Cl.
     CPC ............. *B64G 1/1085* (2013.01); *B64G 1/242* (2013.01)

(58) Field of Classification Search
     CPC .............................. B64G 1/1085; B64G 1/242
     See application file for complete search history.

(56) References Cited

U.S. PATENT DOCUMENTS

| | | | | |
|---|---|---|---|---|
| 5,120,007 | A * | 6/1992 | Pocha et al. | 244/158.4 |
| 5,826,831 | A * | 10/1998 | Anzel | 244/169 |
| 6,102,335 | A * | 8/2000 | Castiel et al. | 244/158.4 |
| 6,305,646 | B1 * | 10/2001 | McAllister et al. | 244/158.8 |
| 6,431,496 | B1 | 8/2002 | Salvatore | |
| 6,725,012 | B1 * | 4/2004 | Janson et al. | 455/12.1 |
| 8,205,839 | B2 | 6/2012 | Anzel et al. | |
| 8,800,932 | B2 * | 8/2014 | Liu et al. | 244/158.4 |
| 2004/0065781 | A1 * | 4/2004 | Bingaman et al. | 244/172 |
| 2008/0027595 | A1 * | 1/2008 | Fowler et al. | 701/13 |
| 2008/0105788 | A1 * | 5/2008 | Anzel et al. | 244/169 |
| 2012/0018585 | A1 * | 1/2012 | Liu et al. | 244/158.6 |
| 2013/0062471 | A1 | 3/2013 | Lim et al. | |

FOREIGN PATENT DOCUMENTS

EP              2586711 A1     5/2013
WO       2008118140 A2    10/2008

OTHER PUBLICATIONS

EP extended European search report for related application 15150678.9 dated Jun. 19, 2015; 8 pp.

* cited by examiner

*Primary Examiner* — Joseph W Sanderson
(74) *Attorney, Agent, or Firm* — Armstrong Teasdale LLP

(57) ABSTRACT

A first inclination vector associated with a first satellite of the plurality of satellites is established. A second inclination vector associated with a second satellite of the plurality of satellites is established. The first satellite and the second satellite are controlled, such that the first satellite and the second satellite are synchronized with a node.

20 Claims, 6 Drawing Sheets

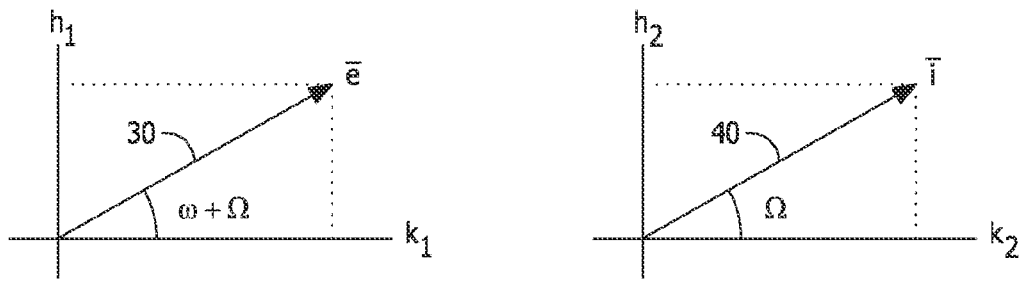

Non-singular e-vector in $k_1$, $h_1$ plane
Eccentricity vector:
$\Sigma = \Omega + \tan^{-1}(\tan(\omega)\cos(i))$
$h_1 = e \sin(\Sigma)$
$k_1 = e \cos(\Sigma)$

Non-singular i-vector in $k_2$, $h_2$ plane
Inclination vector:
$h_2 = \sin(i) \sin\Omega$
$k_2 = \sin(i) \cos\Omega$ $e$ = Orbit Eccentricity
$i$ = Orbit Inclination
$\Omega$ = Right Ascension of Ascending Node
$\omega$ = Argument of Perigee

FIG. 5

METHODS AND APPARATUS FOR CONTROLLING A PLURALITY OF SATELLITES USING NODE-SYNCHRONOUS ECCENTRICITY CONTROL

BACKGROUND

The subject matter described herein relates generally to satellite systems and, more particularly, to methods and systems for controlling a plurality of satellites using node-synchronous eccentricity control.

Spacecraft, such as satellites, are placed in Earth orbits for a variety of purposes, e.g., weather monitoring, scientific observations and commercial communications. Accordingly, they are maintained in a variety of attitudes and placed in a variety of orbits (e.g., low Earth orbit, transfer orbit, inclined geosynchronous orbit and geostationary orbit).

At geosynchronous orbit, a spacecraft's orbital position is typically defined by the orbit's eccentricity, the inclination of the orbital plane from the Earth's equatorial plane, and the spacecraft's longitude. In a geostationary orbit, the spacecraft's orbital period matches the Earth's rotational period, the eccentricity is substantially zero and the spacecraft's orbital plane is substantially coplanar with the Earth's equatorial plane. The principal forces which disturb a spacecraft's position are generated by the gravity of the sun and the moon, the Earth's elliptical shape (triaxiality) and solar radiation pressure.

Inclined geosynchronous orbits, which are often used for communications to mobile customers are similar to those of geostationary orbits, except, they have a non-zero inclination typically in the range of three to seven degrees. Such satellites pass through the equatorial plane twice each day, once at an ascending node (the portion of the satellite orbit above an equatorial plane), and once at a descending node (the portion of the satellite orbit below an equatorial plane). The motion of satellites in inclined geosynchronous orbits is more complex in practice, due to orbit eccentricity, drift and other perturbing forces.

Due to satellite-to-satellite communication interference issues, satellites in geostationary orbits are assigned to geostationary "slots" that may vary from 0.2 degrees wide to 0.1 degrees wide in longitude near the equatorial plane. Despite their motion, interference is still a problem, and satellites in inclined geosynchronous orbits are also assigned to geostationary "slots" near the equatorial plane, with the same constraints between 0.1 degrees and 0.2 degrees in longitude. These longitude constraints are typically defined in a latitude range of between 0.1 degrees and 0.2 degrees in the equatorial zone. The constraints in latitude and longitude, are sometimes referred to as defining a "box".

The processes of maintaining a spacecraft's position with respect to the Earth and a position within the above described "slot" and/or "box" is generally referred to as stationkeeping. Stationkeeping may be facilitated with thrusters which are directed to generate forces through the spacecraft's center of mass. Attitude control is generally facilitated with momentum and/or reaction wheels whose momentum is periodically "dumped" when the same (or different) thrusters are directed to generate turning moments about the spacecraft's center of mass. Conventional thruster systems typically have sets of thrusters that are aligned in north-south and east-west directions. The north-south thrusters produce north-south velocity changes ($\Delta V$) to control inclination. The east-west thrusters produce an east-west $\Delta V$ to control drift (change of longitude with time) and eccentricity.

The problem associated with maintaining a slot and/or box position is especially critical for current and future generation spacecraft. Such spacecraft often have large solar arrays and solar collectors, and therefore receive a strong solar force. This solar force requires a large steady state eccentricity when a single burn sun-synchronous perigee stationkeeping strategy is used. This eccentricity is difficult to control efficiently, even when a sun-synchronous perigee stationkeeping strategy, which compresses eccentricity using double burn control maneuvers, is used. In some satellites, the east/west longitude excursion due to eccentricity can take up more than half the width of the slot. Other factors also consume slot width, including drift over the maneuver cycle, maneuver execution error, $\Delta V$ increments associated with momentum dumping disturbances, orbit determination error, and orbit propagation error.

Maintaining a longitudinal position of such a satellite in a geosynchronous inclined orbit is sometimes referred to as east-west stationkeeping. Maintaining the inclination of the orbit is sometimes referred to as north-south station keeping. Maintaining the longitudinal position of satellites in a geosynchronous inclined orbit has been previously performed based on the sun-synchronous strategy introduced above. The sun-synchronous strategy was developed for use with near stationary orbits having near zero inclination. However, north-south stationkeeping is not required for most mobile communications satellites, which typically have larger inclinations over their lifespan, for example, between three and seven degrees over the life of the satellite.

BRIEF SUMMARY

In one aspect, a method is provided for controlling a plurality of satellites. The method includes establishing a first inclination vector associated with a first satellite of the plurality of satellites, establishing a second inclination vector associated with a second satellite of the plurality of satellites, and controlling the first satellite and the second satellite, such that the first satellite and the second satellite are synchronized with a node.

In another aspect, a control system is provided for controlling a plurality of satellites. The control system includes a memory device containing a first inclination vector associated with a first satellite of the plurality of satellites, and a second inclination vector associated with a second satellite of the plurality of satellites, and a processing device configured to control the first satellite and the second satellite, such that the first satellite and the second satellite are synchronized with a node.

The features, functions, and advantages described herein may be achieved independently in various embodiments of the present disclosure or may be combined in yet other embodiments, further details of which may be seen with reference to the following description and drawings.

BRIEF DESCRIPTION OF THE DRAWINGS

FIG. 5 is a schematic representation of an inclination vector and an eccentricity vector that are associated with a posigrade orbit (i.e., inclination less than 90 degrees).

DETAILED DESCRIPTION

The methods and apparatus described herein relate to satellite systems and, more particularly, to methods and systems for controlling a plurality of satellites using node-synchronous eccentricity control. The methods and systems described herein enable multiple satellites to orbit through a common longitude location using node-synchronous eccentricity control strategy. For example, in one embodiment, a first inclination vector associated with a first satellite of the plurality of satellites is established, a second inclination vector associated with a second satellite of the plurality of satellites is established, and the first satellite and the second satellite are controlled, such that the first satellite and the second satellite are synchronized with a node.

Because the number of longitude slots at geosynchronous orbit is limited, it is desirable to place multiple satellites in the same longitude slot. This is generally referred to as co-location. It generally requires accurate orbit measurement and reliable thruster systems to maintain a safe distance between co-located satellites. There are two general techniques to support the co-location of two or more satellites at geosynchronous orbit in the same longitude location: 1) mean longitude separation, which is achieved by dividing the allocated longitude box into smaller slots for individual satellite; and 2) latitude and radial separation, which is achieved by slight offsets in the co-locating satellites' mean inclination and node (inclination vectors separation) and their mean eccentricity and argument of perigee (eccentricity vectors separation).

Figure 1:
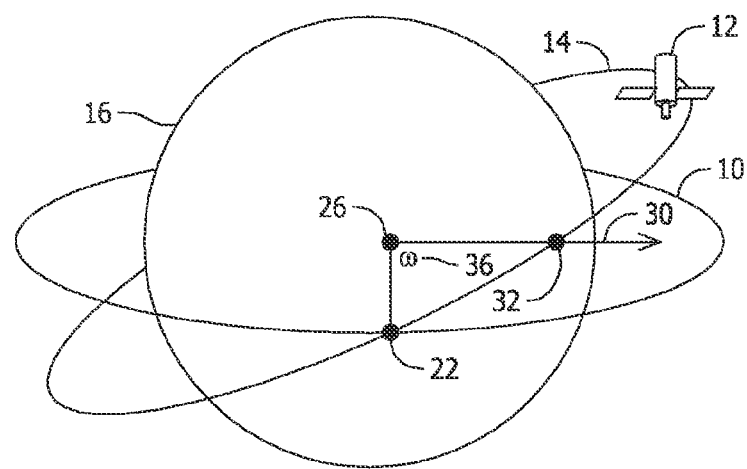
FIG. 1 is a diagram showing a perspective view of a first spacecraft in inclined geosynchronous orbit.
Figure 2:
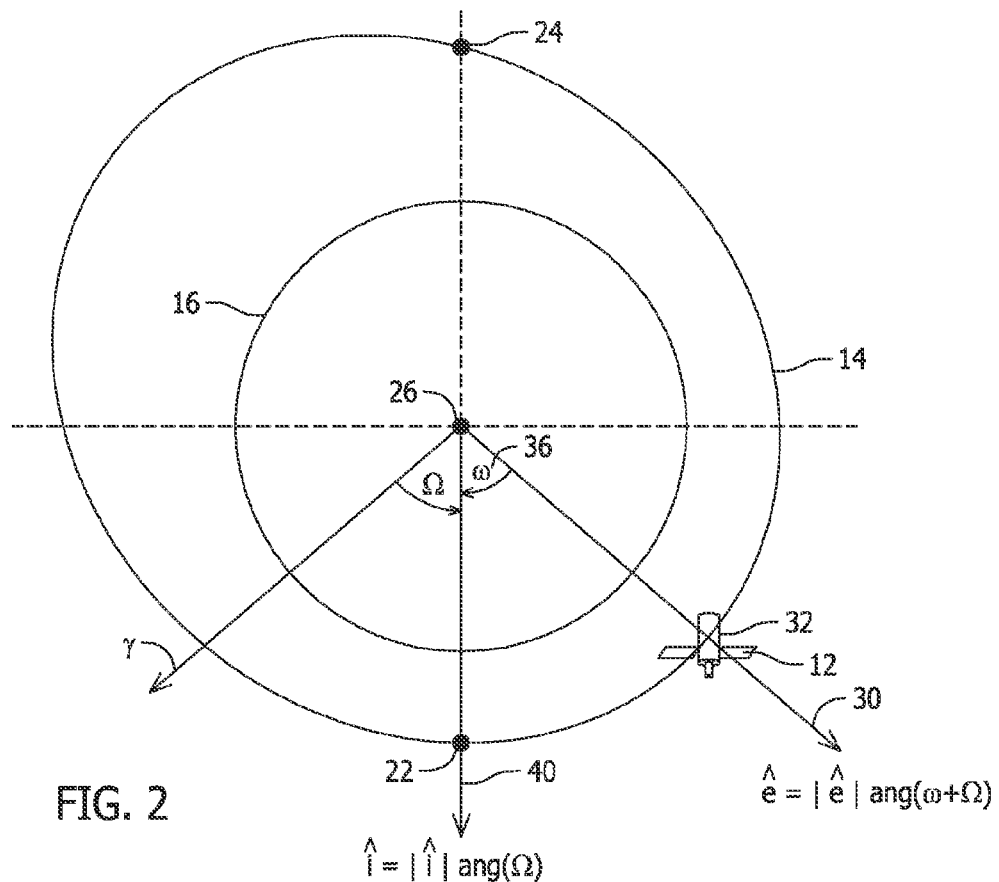
FIG. 2 is a diagram showing a polar view of the first spacecraft shown in FIG. 1.

FIGS. 1 and 2 are diagrams illustrating a geostationary, reference orbit 10, and a first spacecraft or satellite 12 in an inclined geosynchronous orbit 14 with respect to earth 16. In the exemplary embodiment, orbit 14 extends through the equatorial plane of the earth 16 at a first node 22 and a second node 24 (shown in FIG. 2). In the exemplary embodiment, first node 22 is an ascending node, and second node 24 is a descending node. As used herein, an ascending node refers to the crossing of an orbit through the equatorial plane from South to North, and a descending node refers to the crossing of an orbit through the equatorial plane from North to South. The motion of satellite 12 is more complex in practice, due to orbit eccentricity, drift and perturbing forces.

The contribution of an orbital eccentricity to the longitudinal variation of the orbit at the equatorial plane of earth 16 is a function of the absolute value of an eccentricity vector ê and an argument of perigee ω. Specifically, and ignoring second order parameters, the contribution is described by $|2 \times ê \times \sin(\omega)|$. An eccentricity vector ê of an orbit is a vector that extends through the earth center 26 and a perigee position of the orbit. For example, the eccentricity vector 30 of orbit 14 extends through the earth center 26 and perigee position 32. As used herein, the perigee position refers to a position in an orbit in which a satellite is closest to earth 16, and the apogee position refers to a position in an orbit in which a satellite is farthest from earth 16.

An argument of perigee ω of an orbit is an angle that is defined by the earth center 26, an ascending node of the orbit, and a perigee position of the orbit. For example, the argument of perigee 36 of orbit 14 is defined by the earth center 26, ascending node 22, and perigee position 32. The eccentricity vector ê is dependent upon a right ascension (RA) of perigee, $(\omega+\Omega)$, wherein $\Omega$ is the right ascension of the orbit ascending node, and ω is the orbit argument of perigee. The angle $\Omega$ between an inertial reference γ and an ascending node locates an inclination vector $\hat{i}$. The inclination vector $\hat{i}$ of an orbit is a vector that extends through the earth center 26 and an ascending node of the orbit. For example, the inclination vector 40 of orbit 14 extends through the earth center 26 and ascending node 22.

It is beneficial, and in certain applications required, to perform stationkeeping maneuvers so that a satellite remains within its assigned node, slot, or box near the equatorial plane. To control a position of a satellite, a stationkeeping method may be used, in which an argument of perigee ω is caused to be substantially zero (or 180°) based on one or more algorithms within each satellite, which, for example, may be stored in a memory and executed by a processing device. Such a combination, referred to herein as a satellite control system, substantially removes the variation of orbital eccentricity that is normal to the inclination vector $\hat{i}$.

Figure 3:
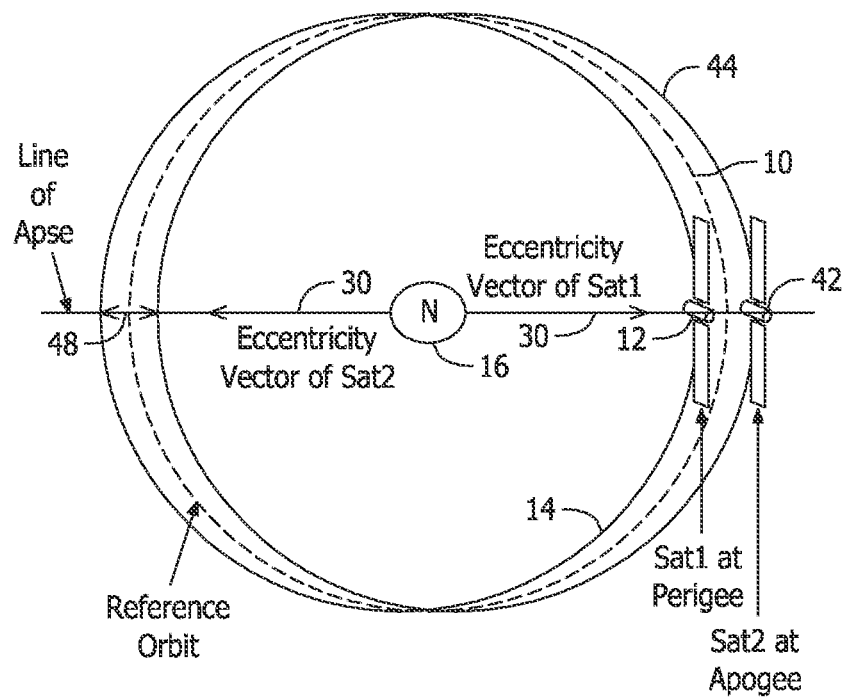
FIG. 3 is a diagram showing a polar view of a plurality of spacecraft in geostationary or inclined geosynchronous orbit.
Figure 4:
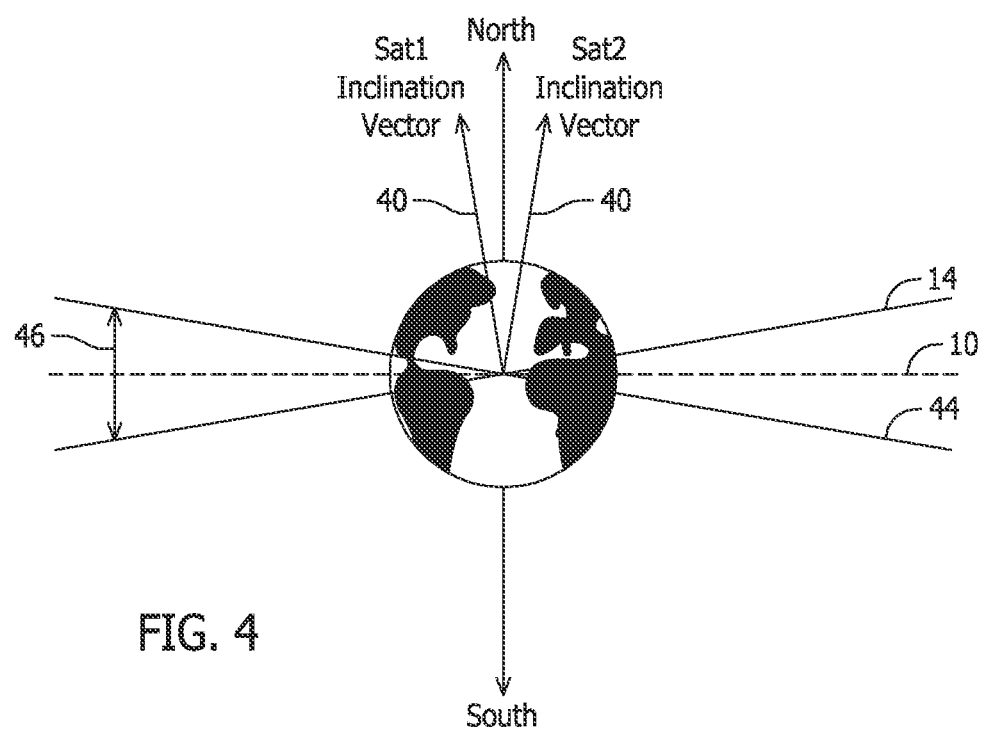
FIG. 4 is a diagram showing an equatorial view of the plurality of spacecraft shown in FIG. 3.

FIG. 3 is a diagram illustrating geostationary, reference orbit 10, first spacecraft or satellite 12 in inclined geosynchronous orbit 14 with respect to earth 16, and a second spacecraft or satellite 42 in an inclined geosynchronous orbit 44 with respect to earth 16. Additionally or alternatively, in at least some embodiments, first satellite 12 and/or second satellite 42 are in a geostationary orbit (i.e., typical inclination less than 0.05 degree). In the exemplary embodiment, first satellite 12 and second satellite 42 are co-located, i.e., satellites 12 and 42 share and/or are associated with at least one node. FIG. 4 is a diagram showing an equatorial view of satellites 12 and 42. Any number of satellites may be co-located with accurate stationkeeping systems, such as electric propulsion.

An inclination vector separation may be established by a timing of inclination drift path or by stationkeeping. The methods and systems described herein utilize either one velocity increment (ΔV) or two velocity increments applied substantially 180 degrees apart along the orbit. These velocity increments, sometimes referred to as velocity changes, are applied to the satellite at approximately six hours before and/or six hours after the ascending node of the orbit. To enable a plurality of satellites to share a common node, in the exemplary embodiment, the inclination vectors for the satellites and/or the timing of the control cycles are offset. The longitudes for the satellites may also be offset to further increase a distance between the satellites.

For inclined geosynchronous orbit, the inclination vector separation may be established by targeting different inclination vector drift paths at a predetermined time of a transfer orbit mission (e.g., the end of the transfer orbit mission), which refers to a series of maneuvers performed to put the satellite at the target orbit location after separation from the launch vehicle.

For thruster systems mounting on gimbaling platform (e.g. electric propulsion with Xenon Ion Engines), the desired velocity changes in the north-south and east-west direction, as well as the momentum dumped, could be achieved by firing a sequence of individual thrusters gimbaled to the optimal orientation at appropriate orbit locations.

The inclination vectors are offset to produce a desired latitude separation in most part of the orbit. In the exemplary embodiment, satellites 12 and 42 are each associated with a respective inclination vector 40 (shown in FIG. 4) that are offset to provide latitude separation 46 (shown in FIG. 4) through most of orbits 14 and 44 (e.g., at points along orbits 14 and 44 outside of at least one node in which satellites 12 and 42 are co-located). The eccentricity vectors are naturally offset to produce a desired radial separation at a nodal crossing (e.g., at the equator for a geosynchronous orbit). In the exemplary embodiment, satellites 12 and 42 are each associated with a respective eccentricity vector 30 (FIG. 3) that are offset to provide radial separation 48 at at least one node in which satellites 12 and 42 are co-located. In the exemplary embodiment, first satellite 12 is at perigee when second satellite 42 is at apogee, and first satellite 12 is at apogee when second satellite 42 is at perigee. The eccentricity vector for each of the co-locating satellites is set to follow the respective inclination vector. A minimum limit may be established for the eccentricity vector to facilitate preventing the radial separation from being too small. Additionally or alternatively, the longitude of the co-locating satellites may be offset to further increase the radial separation.

FIG. 5 is a graphical representation of inclination vector 40 and eccentricity vector 30. A non-singular inclination vector $\hat{i}$ is defined in a $k_2$, $h_2$ plane, wherein $h_2$=sin ($\hat{i}$) sin $\Omega$, and $k_2$=sin ($\hat{i}$) cos $\Omega$, and $\Omega$ is a right ascension of an ascending node. A non-singular eccentricity vector $\hat{e}$ is defined in a $k_1$, $h_1$ plane, wherein $h_1$=$\hat{e}$ sin ($\Omega$+tan$^{-1}$ (tan ($\omega$) cos ($\hat{i}$))), and $k_1$=$\hat{e}$ cos ($\Omega$+tan$^{-1}$ (tan ($\omega$) cos ($\hat{i}$))), $\Omega$ is the right ascension of an ascending node, and $\omega$ is argument of perigee 36.

Figure 6:
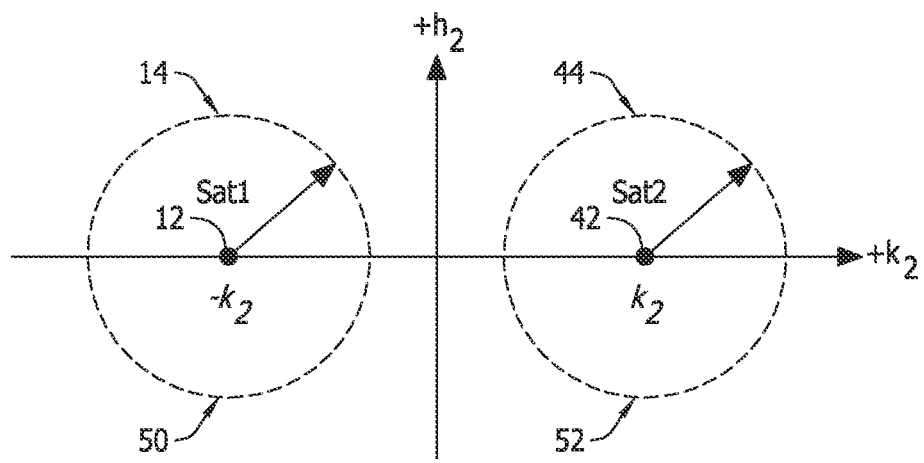
FIG. 6 is a schematic representation of a placement of the plurality of spacecraft shown in FIG. 3.

FIG. 6 is a detailed diagram illustrating orbit 14 and orbit 44 at a node. In the exemplary embodiment, satellites 12 and 42 are offset in the $k_2$ direction. First satellite 12 is associated with a first zone 50 of the node and second satellite 42 is associated with a second zone 52 of the node that is different and spaced from first zone 50 to account for any residual motion of inclination vector 40. Zones 50 and/or 52 may be smaller for satellites using engines that provide more precise control of the inclination vectors 40 (e.g., than for engines that provide less precise control of the inclination vectors 40).

Figure 7:
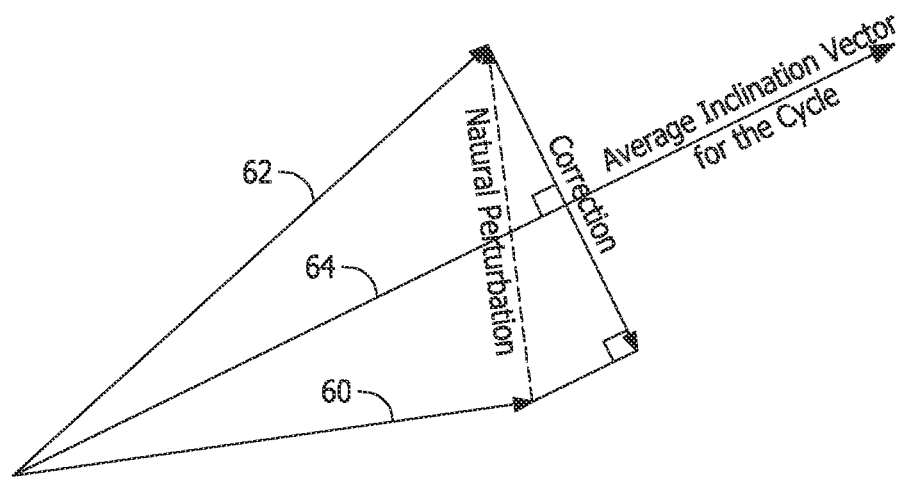
FIG. 7 is a schematic representation of controlling the spacecraft shown in FIG. 1 using node-synchronous eccentricity control.

FIG. 7 is a graphical representation of controlling a satellite using node-synchronous eccentricity control. At the start of a control cycle, a satellite is associated with a first eccentricity vector 60. Through natural perturbation, the satellite drifts over a period of the control cycle and moves towards being associated with a second eccentricity vector 62. At a first predetermined point in the control cycle, a control maneuver is started to move the orbit towards first eccentricity vector 60. At a second predetermined point in the control cycle (e.g., when the orbit is re-associated with first eccentricity vector 60), the control maneuver is finished, and the control cycle restarts. The satellite is controlled such that an average eccentricity vector 64 substantially follows or tracks an average inclination vector. In at least some implementations, the eccentricity vector may be opposite the inclination vector.

Figure 8:
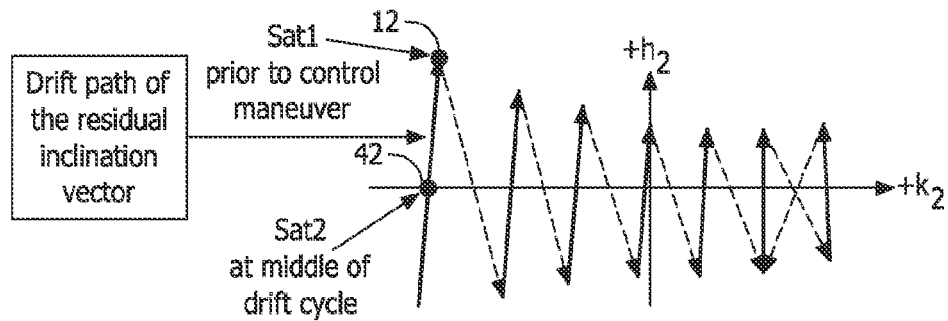
FIG. 8 is a schematic representation of controlling the plurality of spacecraft shown in FIG. 3 by offsetting a timing of control cycles.

FIG. 8 is a graphical representation of controlling a plurality of satellites by offsetting the timing of the inclination control cycles. In the exemplary embodiment, a control maneuver for a first satellite 12 starts when a second satellite 42 is halfway through a drift cycle. For example, in one embodiment, with a 14-day control cycle, the control maneuver starts for a first satellite on Day 1, and the control maneuver starts for the second satellite on Day 8. Alternatively, the control cycle may be offset by any portion of the control cycle that enables the satellites to function as described herein.

Figure 9:
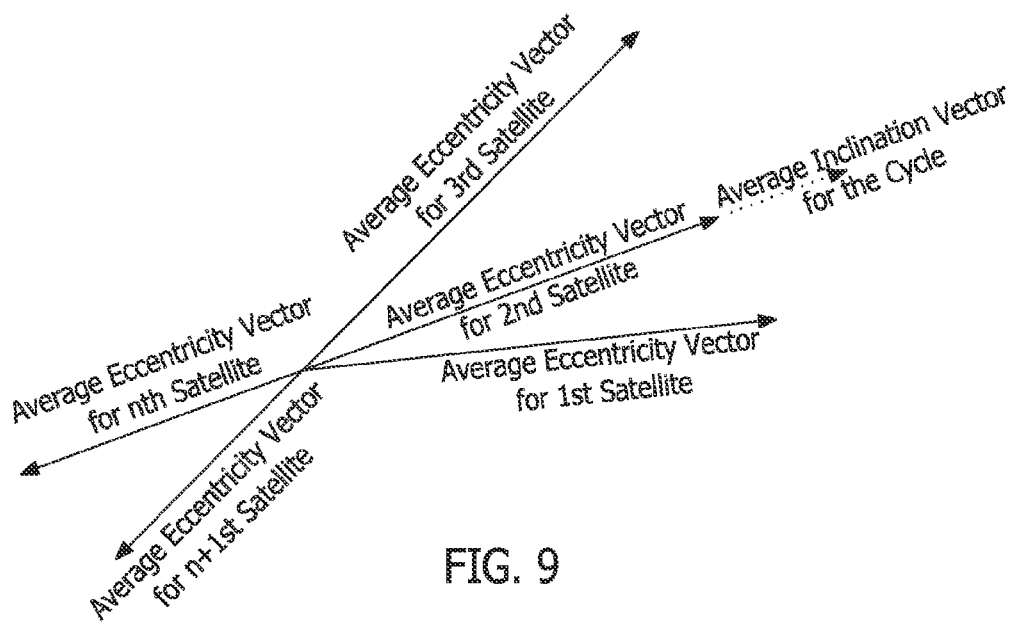
FIG. 9 is a schematic representation of controlling the plurality of spacecraft shown in FIG. 3 by offsetting the eccentricity vectors.

FIG. 9 is a graphical representation of controlling a plurality of satellites by offsetting the eccentricity vectors. In the exemplary embodiment, eccentricity vector separation may be introduced by angular offset between the average eccentricity vector and the average inclination vector for each of the co-located satellites.

Figure 10:
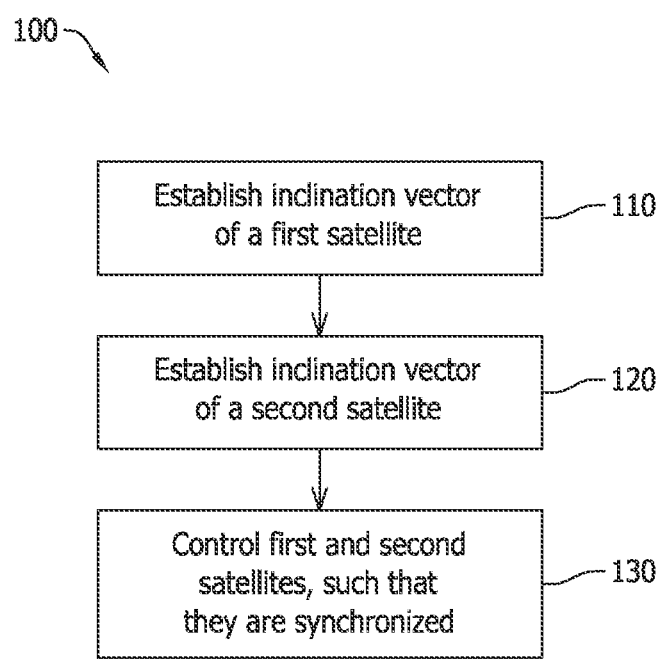
FIG. 10 is a flowchart illustrating a method for controlling the plurality of spacecraft shown in FIG. 3.

FIG. 10 is a flowchart illustrating a method 100 for controlling a plurality of satellites in any combination of inclined synchronous orbit and/or geostationary orbit. A first inclination vector associated with a first satellite 12 is identified and/or established 110. A second inclination vector associated with a second satellite 42 is identified and/or established 120. First satellite 12 and second satellite 42 are controlled 130, such that first and second satellites 12 and 42 are synchronized with at least one common node. For example, in one embodiment, first satellite 12 is controlled 130 in accordance with the first inclination vector, such that first satellite 12 is associated with a first portion or zone 50 of the node, and second satellite 42 is controlled 130 in accordance with the second inclination vector, such that second satellite 42 is associated with a second portion or zone 52 of the node. Additionally or alternatively, a control maneuver for first satellite 12 is started at a first time, and a control maneuver for second satellite 42 is started at a second time different from the first time.

To facilitate controlling a satellite using node-synchronous eccentricity control, a value of a right ascension of an ascending node for an inclination vector associated with a satellite is averaged over a period of the control cycle of the satellite and corrections for the satellite are managed such that an eccentricity vector associated with the satellite rotates at substantially the same rate as the inclination vector.

To provide the same rate of rotation for these vectors, or stated differently, in order for the eccentricity vector, $\hat{e}$, to be made to track the inclination vector 40, $\hat{i}$, in one embodiment, a control program is provided which maintains the colinearity of the eccentricity vector with the inclination vector. Maintaining the colinearity of the eccentricity vector with the inclination vector is sometimes referred to as being node synchronous. As such, the methods and systems described herein are sometimes referred to as node-synchronous eccentricity control.

With respect to an orbit of a satellite, solar forces provide the dominant perturbation of the eccentricity vector, $\hat{e}$. In the absence of mitigating maneuvers, the solar forces cause the eccentricity vector to trace out a circle in the phase plane ($h_1$, $k_1$). The period of this motion is one year and the radius of the circle is about 0.00054 radians for a solar radiation force (SRF) that is equal to 750 milli-newtons (mnt) and a satellite mass of about 3400 kilograms. The maximum eccentricity is minimized by properly initializing the satellite 42, which centers the circle at (0,0). The control program for satellite 42 includes two predominately tangential corrections, which are separated in right ascension, producing a change in the eccentricity vector, $\Delta\hat{e}$, normal to the direction which is colinear with the inclination vector 40, $\hat{i}$. The magnitude of $\Delta\hat{e}$ is ideally equal but opposite to the component of the eccentricity vector to be negated. The portion of the eccentricity vector that remains after the negation is colinear with the inclination vector and varies approximately sinusoidally with a period of one year and amplitude of 0.00054 (using example given above). As will be appreciated by those of skill in the art, a complete cancellation of the normal component is unrealizable, however, by performing daily corrections, the pointing variation can be reduced to about +/−0.5 degree. For a weekly correction frequency, the pointing variation is reduced to about +/−3.5 degrees.

As stated above the ascending node of the inclination vector advances at an average rate of about four degrees per year. The eccentricity vector can be made to track the inclination vector most closely by adjusting the magnitudes of the cyclic corrections in the eccentricity vector just enough so that, on the average, the eccentricity vector rotates at substantially the same rate as the inclination vector.

Under the influence of the earth's oblateness and lunar/solar gravity as well as control strategy, the inclination vector 40, $\hat{i}$, will vary with time. In order to produce the above described ω=0° (or 180°) condition, the eccentricity vector is controlled to track (remain synchronous with) the inclination vector. This is the basis for the above described node-synchronous eccentricity control methods, which in certain embodiments, includes computational algorithms within the satellite to provide the intended control.

Input to the computational algorithms specify the known value of the inclination vector right ascension of the ascending node averaged over the period of the satellite control cycle. The change in the eccentricity vector during this period (without considering maneuvers) is computed from a perturbation model. Correction is performed on the normal component change in the eccentricity. The remaining variation maximums in the eccentricity vector are minimized by proper orbit initialization, as the case for inclined geosynchronous orbit, or be properly reduced to keep the longitude of the geostationary satellites within their designated slot. However, to first order, this does not affect the result, which is to achieve ω≈0 (or 180°) and thus virtually eliminate the effect of eccentricity on longitude variation when the absolute value of the latitude is less than 0.05 degrees.

The embodiments described herein relate generally to satellite systems and, more particularly, to methods and systems for controlling a plurality of satellites using node-synchronous eccentricity control. The embodiments described herein enable multiple satellites to pass through the same longitude location using node-synchronous eccentricity control strategy. Specifically, the embodiments described herein to enable multiple geosynchronous satellites to be located at the same longitude location based on the specification of an inclination vector and/or an offset in timing of the inclination control cycle.

The methods and systems described herein may be implemented using computer programming or engineering techniques including computer software, firmware, hardware or any combination or subset thereof, wherein the technical effects may include at least one of: a) establishing a first inclination vector associated with a first satellite of the plurality of satellites; b) establishing a second inclination vector associated with a second satellite of the plurality of satellites; c) averaging a value of a right ascension of a node for the first inclination vector and/or the second inclination vector over a period of a control cycle; d) managing a plurality of predominately tangential corrections for the first satellite and/or the second satellite; e) computing an eccentricity vector over the period of the control cycle from a perturbation model; f) computing corrections for a normal component of the eccentricity vector; g) removing variations of orbital eccentricity that are normal to the inclination vector; h) minimizing a maximum variation of the eccentricity vector based on an orbit initialization; i) reducing the eccentricity vector to facilitate maintaining a longitude of at least one of the first satellite and the second satellite within a predetermined slot; j) averaging the first inclination vector and/or the second inclination vector over the period of the control cycle; k) managing corrections for the first satellite and/or the second satellite; l) controlling the first satellite in accordance with the first inclination vector; m) controlling the first satellite in accordance with the first inclination vector; and n) controlling the second satellite in accordance with the second inclination vector.

Exemplary embodiments of methods and systems for controlling a plurality of satellites using node-synchronous eccentricity control are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a plurality of satellites, the method comprising:
    establishing a first inclination vector associated with a first satellite of the plurality of satellites, the first satellite travelling in a first inclined geosynchronous orbit;
    establishing a second inclination vector associated with a second satellite of the plurality of satellites, the second satellite travelling in a second inclined geosynchronous orbit; and
    controlling the first satellite and the second satellite such that the first satellite and the second satellite are synchronized with a node, wherein the first and second inclination vectors are offset from each other such that a radial offset is defined between orbital paths of the first and second satellites at the node, and such that latitude separation is defined between the orbital paths of the first and second satellites away from the node.

2. A method in accordance with claim 1, wherein controlling the first satellite and the second satellite further comprises:
    controlling the first satellite in accordance with the first inclination vector, such that the first satellite is associated with a first portion of the node; and
    controlling the second satellite in accordance with the second inclination vector, such that the second satellite is associated with a second portion of the node, the second portion spaced from the first portion, wherein the first and second inclined geosynchronous orbits both have a non-zero eccentricity.

3. A method in accordance with claim 1, wherein controlling the first satellite further comprises starting a control maneuver for the first satellite at a first time, and controlling the second satellite further comprises starting a control maneuver for the second satellite at a second time different from the first time.

4. A method in accordance with claim 1, wherein at least one of establishing a first inclination vector and establishing a second inclination vector further comprises:
- averaging a value of a right ascension of the node for at least one of the first inclination vector and the second inclination vector over a period of a control cycle; and
- managing a plurality of predominately tangential corrections for at least one of the first satellite and the second satellite such that an eccentricity vector, directed at perigee, is substantially collinear with and substantially tracks the at least one of the first inclination vector and the second inclination vector such that latitude control of the at least one of the first satellite and the second satellite is not required to maintain the at least one of the first satellite and the second satellite in an orbit.

5. A method in accordance with claim 4 further comprising:
- minimizing a maximum variation of the eccentricity vector based on an orbit initialization;
- reducing the eccentricity vector to facilitate maintaining a longitude of at least one of the first satellite and the second satellite within a predetermined slot;
- averaging at least one of the first inclination vector and the second inclination vector over the period of the control cycle; and
- managing corrections for the at least one of the first satellite and the second satellite such that the eccentricity vector rotates at substantially the same rate as the at least one of the first inclination vector and the second inclination vector.

6. A method in accordance with claim 4, wherein averaging a value of a right ascension comprises averaging the value based on at least one of an influence based on an oblateness of the earth and lunar and solar gravity on the at least one of the first inclination vector and the second inclination vector.

7. A method in accordance with claim 4, wherein managing a plurality of predominately tangential corrections for the satellite comprises:
- computing the eccentricity vector over the period of the control cycle from a perturbation model; and
- computing corrections of the eccentricity vector by computing thruster firing durations and locations along the orbit based on a configuration of the thrusters.

8. A method in accordance with claim 4, wherein managing a plurality of predominately tangential corrections for the satellite comprises utilizing at least one of a velocity change, two velocity changes approximately 180 degrees apart along the orbit, a velocity change approximately six hours prior to the node, and a velocity change approximately six hours after the node.

9. A method in accordance with claim 4, wherein managing a plurality of corrections for the satellite comprises removing the variations of orbital eccentricity that are normal to the inclination vector.

10. A method in accordance with claim 9, wherein removing the variations of orbital eccentricity comprises causing an argument of perigee for the eccentricity vector to be one of substantially zero and substantially 180°, based upon one or more algorithms within the at least one of the first satellite and the second satellite.

11. A control system for controlling a plurality of satellites, said control system comprising:
- a memory device containing a first inclination vector associated with a first satellite of the plurality of satellites, and a second inclination vector associated with a second satellite of the plurality of satellites, the first satellite travelling in a first inclined geosynchronous orbit, and the second satellite travelling in a second inclined geosynchronous orbit; and
- a processing device configured to control the first satellite and the second satellite such that the first satellite and the second satellite are synchronized with a node, wherein the first and second inclination vectors are offset from each other such that a radial offset is defined between orbital paths of the first and second satellites at the node, and such that latitude separation is defined between the orbital paths of the first and second satellites away from the node.

12. A control system in accordance with claim 11, wherein the processing device is further configured to:
- control the first satellite in accordance with the first inclination vector, such that the first satellite is associated with a first portion of the node; and
- control the second satellite in accordance with the second inclination vector, such that the second satellite is associated with a second portion of the node, the second portion spaced from the first portion.

13. A control system in accordance with claim 11, wherein the processing device is further configured to:
- start a control maneuver for the first satellite at a first time; and
- start a control maneuver for the second satellite at a second time different from the first time.

14. A control system in accordance with claim 11, wherein the processing device is further configured to:
- average a value of a right ascension of the node for at least one of the first inclination vector and the second inclination vector over a period of a control cycle; and
- manage a plurality of corrections for at least one of the first satellite and the second satellite such that an eccentricity vector, directed at perigee, is substantially collinear with and substantially tracks the at least one of the first inclination vector and the second inclination vector such that latitude control of the at least one of the first satellite and the second satellite is not required to maintain the at least one of the first satellite and the second satellite in an orbit.

15. A control system in accordance with claim 14, wherein the processing device is further configured to:
- minimize a maximum variation of the eccentricity vector based on an orbit initialization;
- reduce the eccentricity vector to facilitate maintaining a longitude of at least one of the first satellite and the second satellite within a predetermined slot;
- average at least one of the first inclination vector and the second inclination vector over the period of the control cycle; and
- manage corrections for the at least one of the first satellite and the second satellite such that the eccentricity vector rotates at substantially the same rate as the at least one of the first inclination vector and the second inclination vector.

16. A control system in accordance with claim 14, wherein the processing device is further configured to average the value of the right ascension based on at least one of an influence based on an oblateness of the earth and lunar and solar gravity on the at least one of the first inclination vector and the second inclination vector.

17. A control system in accordance with claim 14, wherein the processing device is further configured to compute the eccentricity vector over the period of the control cycle from a perturbation model; and compute corrections of the eccentricity vector by computing thruster firing durations and locations along the orbit based on a configuration of the thrusters.

18. A control system in accordance with claim 14, wherein the processing device is further configured to utilize at least one of a velocity change, two velocity changes approximately 180 degrees apart along the orbit, a velocity change approximately six hours prior to the node, and a velocity change approximately six hours after the node.

19. A control system in accordance with claim 14, wherein the processing device is further configured to remove the variations of orbital eccentricity that are normal to the inclination vector.

20. A control system according to claim 19, wherein the processing device is further configured to cause an argument of perigee for the eccentricity vector to be one of substantially zero and substantially 180°, based upon one or more algorithms within the at least one of the first satellite and the second satellite.

* * * * *